United States Patent
Jai et al.

(10) Patent No.: US 9,038,038 B1
(45) Date of Patent: May 19, 2015

(54) JUST IN TIME CLOUD COMPILATION

(75) Inventors: Benchiao Jai, Mountain View, CA (US); Chia-Chi Yeh, Taipei (TW)

(73) Assignee: Google Inc., Mountain View, CA (US)

( * ) Notice: Subject to any disclaimer, the term of this patent is extended or adjusted under 35 U.S.C. 154(b) by 231 days.

(21) Appl. No.: 13/097,239

(22) Filed: Apr. 29, 2011

Related U.S. Application Data (60) Provisional application No. 61/350,401, filed on Jun. 1, 2010.

(51) Int. Cl.
*G06F 9/45* (2006.01)
*G06F 9/445* (2006.01)

(52) U.S. Cl.
CPC .......................... *G06F 8/65* (2013.01)

(58) Field of Classification Search
USPC ........................... 717/148, 139, 140, 146, 147
See application file for complete search history.

(56) References Cited

U.S. PATENT DOCUMENTS

| | | | | |
|---|---|---|---|---|
| 6,085,307 A * | 7/2000 | Evoy et al. | ....................... | 712/31 |
| 2002/0032718 A1* | 3/2002 | Yates et al. | ..................... | 709/107 |
| 2002/0112227 A1* | 8/2002 | Kramskoy et al. | ............ | 717/148 |
| 2003/0005425 A1* | 1/2003 | Zee | ................................ | 717/166 |
| 2003/0110479 A1* | 6/2003 | Rajaram | ........................ | 717/140 |
| 2004/0225747 A1* | 11/2004 | Kadi | ............................... | 709/232 |
| 2006/0036721 A1* | 2/2006 | Zhao et al. | ..................... | 709/223 |
| 2007/0260629 A1* | 11/2007 | Tseitlin et al. | ................. | 707/102 |
| 2009/0054117 A1* | 2/2009 | Beser et al. | ....................... | 463/1 |
| 2010/0041380 A1* | 2/2010 | Hewes et al. | ............... | 455/414.4 |
| 2010/0115501 A1* | 5/2010 | Partridge et al. | ............... | 717/148 |
| 2010/0313189 A1* | 12/2010 | Beretta et al. | ................. | 717/148 |

\* cited by examiner

*Primary Examiner* — Chat Do
*Assistant Examiner* — Jae Jeon
(74) *Attorney, Agent, or Firm* — Honigman Miller Schwartz and Cohn LLP (57) ABSTRACT

Methods, systems, and apparatus, including computer programs encoded on a computer storage medium, for just in time compilation. In one aspect, a method includes receiving an application on a mobile device, the mobile device including a processor for executing native code and an interpreter for interpreting intermediate code, wherein an application includes at least one machine instruction; receiving data characterizing prior actions of the application on the mobile device; determining a portion of intermediate code to be compiled into native code based at least in part on the data, wherein the portion includes some but not all of the application; sending the portion of intermediate code over a network to a compilation server; receiving native code corresponding to the portion of intermediate code from the compilation server; and executing the native code on the processor.

12 Claims, 5 Drawing Sheets

JUST IN TIME CLOUD COMPILATION

CROSS-REFERENCE TO RELATED APPLICATIONS

This application claims the benefit of U.S. Provisional Applications No. 61/350,401 filed Jun. 1, 2010. The above-referenced application is incorporated herein by reference.

BACKGROUND

This specification relates to software compilation on mobile devices.

Many applications are provided in a machine-independent intermediate code. The intermediate code is interpreted by a virtual machine which, in some cases, also translates the code into native, i.e., machine, instructions. However, execution by interpretation has an adverse effect on performance. Just in time compilers are a common way to improve performance for intermediate code that runs on a virtual machine, e.g., Java bytecode. The compiled native code executes faster, but native code generally requires more storage space than intermediate code.

For devices that have low computing power and memory capacity, for example cell phones and other mobile devices, the just in time compilation may be slow and the resulting native code may be of poor quality.

SUMMARY

In general, one innovative aspect of the subject matter described in this specification can be embodied in methods that include the actions of receiving an application on a mobile device, the mobile device including a processor for executing native code and an interpreter for interpreting intermediate code, wherein an application includes at least one machine instruction; receiving data characterizing prior actions of the application on the mobile device; determining a portion of intermediate code to be compiled into native code based at least in part on the data, wherein the portion includes some but not all of the application; sending the portion of intermediate code over a network to a compilation server; receiving native code corresponding to the portion of intermediate code from the compilation server; and executing the native code on the processor Other embodiments of this aspect include corresponding systems, apparatus, and computer programs, configured to perform the actions of the methods, encoded on computer storage devices.

In general, another aspect of the subject matter described in this specification can be embodied in methods that include the actions of executing the portion of intermediate code by the interpreter in response to a timeout being exceeded after sending the portion of intermediate code to the compilation server; receiving, on the compilation server, the portion of intermediate code; identifying a platform of the mobile device; generating, on the compilation server, platform specific native code corresponding to the portion of intermediate code; sending, from the compilation server, the platform specific native code to the mobile device; storing the native code corresponding to the sent intermediate code on the compilation server for later use by a different mobile device; determining that a previously compiled version of the platform specific native code is not available; and compiling the portion of intermediate code into platform specific native code in response to determining that a previously compiled version of the platform specific native code is not available.

Particular embodiments of the subject matter described in this specification can be implemented so as to realize one or more of the following advantages. Performance of applications on mobile devices may be improved. The use of space on the mobile device may be improved.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
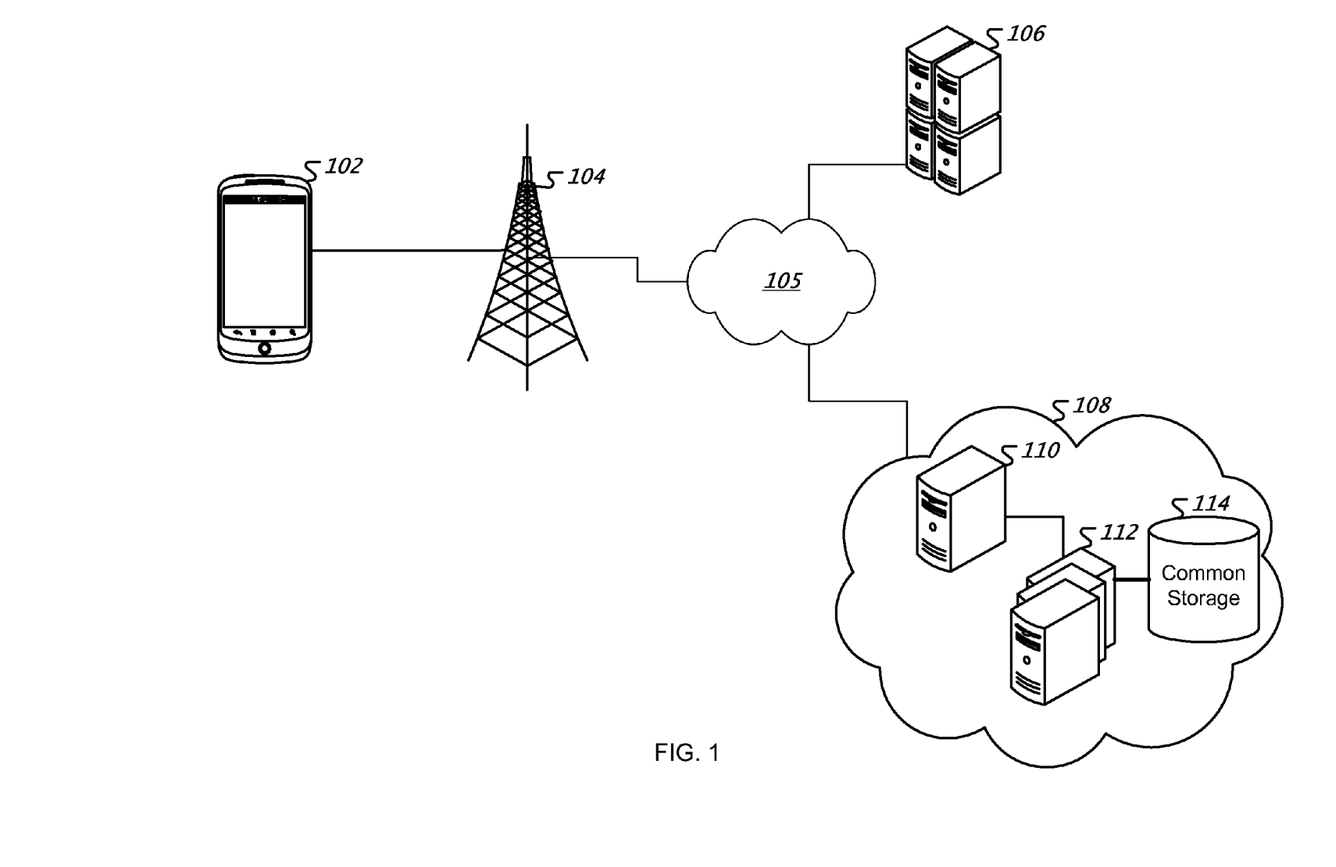
FIG. 1 is a block diagram of a system implementing just in time cloud compilation.

FIG. 1 is a block diagram of a system implementing just in time cloud compilation. A mobile device 102 communicates with a network by sending signals to and receiving signals from an antenna connected to a base station 104 that is communicatively coupled to an application server 106 and a compilation cloud 108 over a wide area network 105. In some implementations, the base station is part of a cellular telephone network used in cellular phone communications. The mobile device communicates with the base station using conventional cellular communications protocols, for example the 3rd Generation Partnership Project (3GPP) standard protocols for example Global System for Mobile Communications (GSM), or other cellular communication protocols, for example CDMA2000. In some embodiments the mobile device is a handheld cellular telephone device.

In general, the base station communicates to the application server over a wide area network (WAN) for example the Internet. In other implementations, the base station may be part of a wireless access point allowing access to the WAN. The mobile device communicates with the wireless access point using wireless local area network standards, for example the IEEE 802.11a-n standards.

The compilation cloud includes a compilation service 110, the compilation services is a server or other computing device that provides access to the compilation cloud. The compilation cloud also includes one or more compilation servers 112. The compilation servers process the incoming requests that are routed by the compilation service. The compilation service assigns requests to the compilation servers using conventional load balancing techniques. In some arrangements, the compilation cloud also includes a common storage database 114 which provides common storage for the compilation servers. In general, the compilation cloud offers scalable compilation services. Scalability is achieved by the ability to add or remove compilation servers to the cloud. The addition or removal of a compilation server is transparent outside of the compilation cloud.

In some scenarios, the mobile device sends a request for an application to the application server 106. The term application refers to any module, program, or instructions of computer software code capable of being executed by a computer, in particular, by the mobile device. The application server provides the application to the mobile device in response to the request. In other scenarios, an application may already be present on the mobile device. The application may be part of an operating system running on the mobile device, or the application may have been previously received through some other conventional mechanism. For example, the application may have been transferred to the mobile device from a computer using a universal serial bus (USB) connection.

The application may include intermediate code or native code or both. Intermediate code includes machine independent instructions which are interpreted by an interpreter, for example a virtual machine. Machine or native code is code made up of instructions in the native instruction set that can be executed directly by the processor.

Intermediate code provides several advantages over native code. Intermediate code is independent of the platform upon which it will be executed. The same intermediate code may be executed by various mobile platforms by interpreters running on the mobile platforms.

Figure 2:
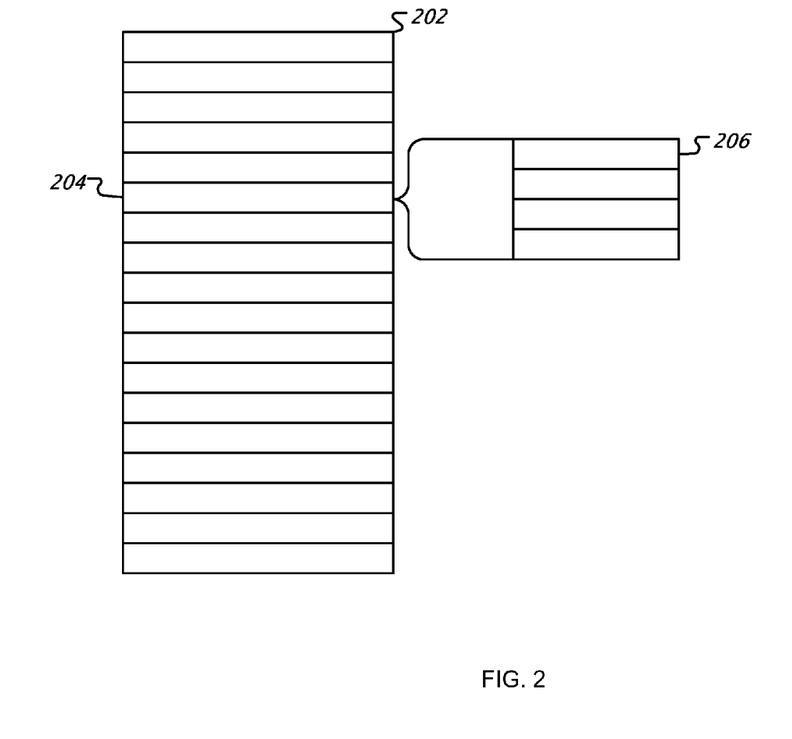
FIG. 2 is a block diagram illustrating intermediate code and corresponding native instructions.

FIG. 2 is a block diagram illustrating intermediate code and corresponding native instructions. An interpreter receives an application 202 containing intermediate code. To execute the code, an interpreter interprets the portions of intermediate code to be executed, for example instruction 204.

In addition to being capable of being executed on many different platforms, intermediate code is generally more concise than native code. For example, one instruction in intermediate code 204 may correspond to four or more native instructions 206. In contrast, native code is made up of native instructions. Therefore, an application coded in intermediate code will be smaller than the same application coded in native code.

The process of converting intermediate code to native instructions is time consuming. Applications containing intermediate code generally exhibit worse performance than the same application containing native code.

Figure 3:
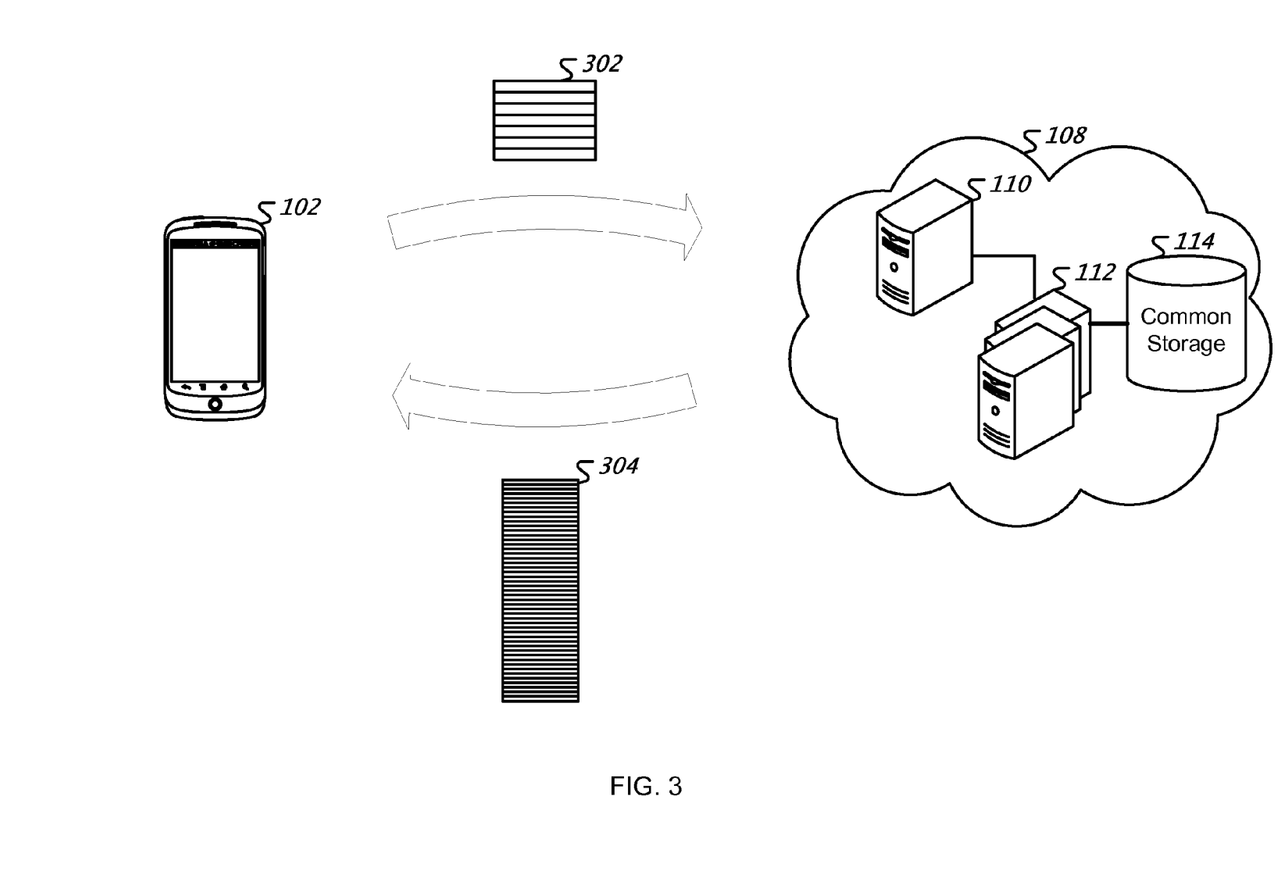
FIG. 3 is a block diagram illustrating a mobile device sending intermediate code to a compilation cloud and receiving native code.

In order to improve performance, the mobile device may determine that the intermediate code should be compiled into native code. FIG. 3 is a block diagram illustrating a mobile device sending intermediate code to a compilation cloud and receiving native code. In some implementations, the mobile device 102 sends the application or a portion of the application containing intermediate code 302 to the compilation cloud service 110. As discussed above, the compilation cloud service routes the intermediate code to a compilation server, which compiles the intermediate code into native code. The native code 304 is sent to the mobile device. The native code 304 is generally substantially larger than the intermediate code 302.

In other implementations, the mobile device sends data to the compilation cloud sufficient the permit the cloud to identify the portion of intermediate code to compile. For example, the mobile device may send a unique identifier that identifies the application and offsets which identify the intermediate code instructions to compile. The compilation server that is assigned to compile the code by the compilation service returns the compiled native code to the mobile device. The native code may be stored on the common data store or the compilation server may obtain the code from the application server. In scenarios where the compilation server is unable to obtain the portion of intermediate code, the compilation server sends a message to the mobile device requesting the portion of intermediate code.

Figure 4:
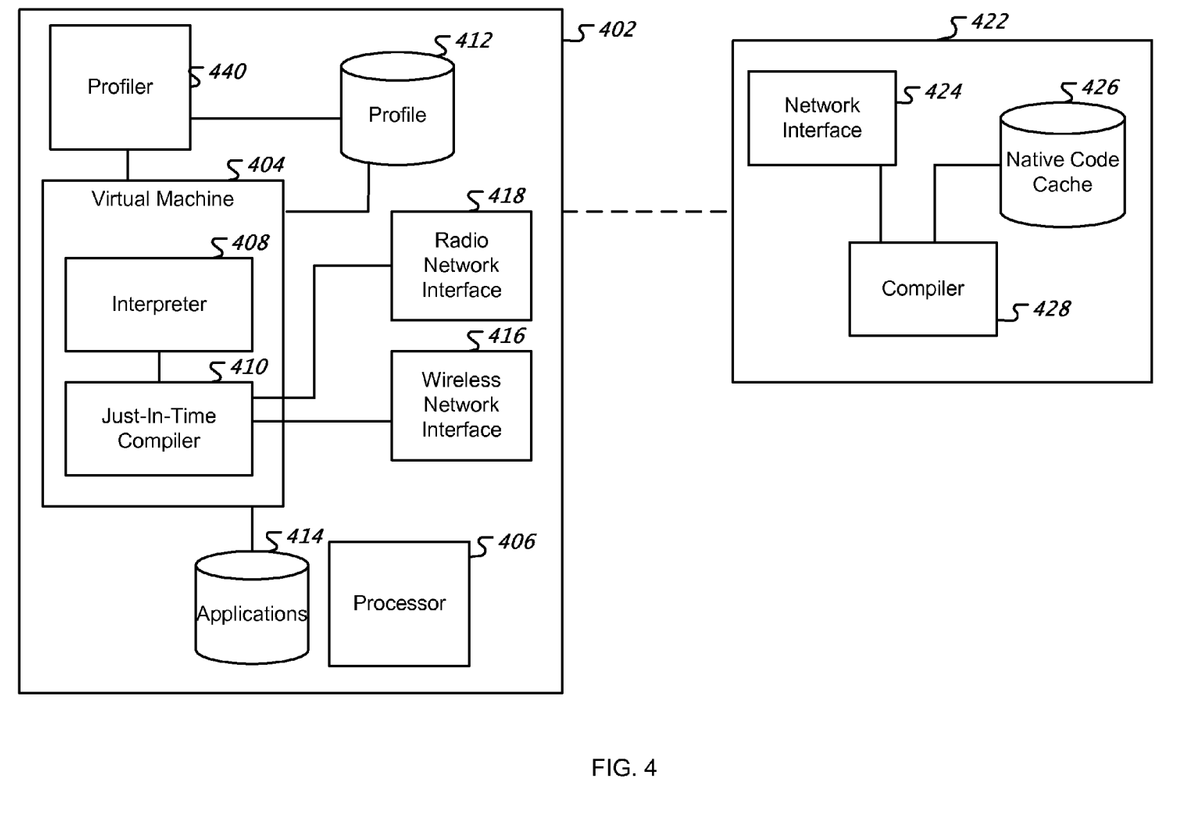
FIG. 4 is a block diagram of an exemplary mobile device and an exemplary compilation server.

FIG. 4 is a block diagram of an exemplary mobile device and an exemplary compilation server. The exemplary mobile device 402 has a processor 406 that implements a native instruction set. Implemented on the mobile device is a virtual machine 404 that, among other things, processes and executes intermediate code by interpretation. The virtual machine includes an interpreter 408 for interpreting intermediate code and a just in time compiler for managing the compilation of portions of the intermediate code. A portion of code may be a function, method, subroutine, class, or an arbitrary number of consecutive code instructions.

The mobile device has an application data store 414. Applications on the mobile device are stored in the application data store. The software of each application may include intermediate code, native code, or a combination of both. The mobile device also includes a radio network interface 418 used to communicate over a radio network. In some implementations, the mobile device also includes a wireless network interface 416 used to communicate over a wireless local area network.

In some implementations, the virtual machine provides a callback interface to provide runtime information. In general, a callback is a reference to a function, method, or subroutine. The profiler registers one or more callbacks to the virtual machine. As part of the registration process the profiler indicates which information should be provided through the corresponding callback.

In some implementations, the virtual machine provides a callback interface to provide profiling information. In general, a callback is a reference to executable code provided as an argument to another piece of executable code. The profiler registers a reference to an executable portion of the profiler to the virtual machine. As part of the registration process the profiler indicates which events should result in the executable profiler code being executed.

The virtual machine may notify the profiler of processing related events, for example when a portion of code is executed, when a portion of code finishes executing, when a thread is started, when a thread is terminated, when a class is loaded, when a class is unloaded, when a thread is waiting, when a thread stops waiting; memory related events for example when memory is allocated, when memory is moved, when memory is released; and compilation events for example when the just in time compiler starts compilation and when the just in time compiler completes compilation.

When the profiler is executed in response to an event, the virtual machine provides information sufficient to enable the profiler to identify the portions of code to which the events relate. The profiler writes the information in the profile 412. The profiler may aggregate the information in the profile to create metrics which describe the application. For example, the profiler may determine how long it takes a portion of code to execute, how often a portion of code executes, and how long it takes to compile a portion of code.

The profile is used by the virtual machine to identify portions of code which could benefit from compilation. For example, the virtual machine may determine that portions of code that take a long time to execute and/or are executed frequently should be compiled. The determination may be based on threshold values (for example, any portion of code that executes more than 5 times a day should be compiled) or based on comparisons (for example, the top ten percent of code in terms of frequency of execution should be compiled). The virtual machine may also use other factors, for example a static evaluation of the portion of code and how much storage space is available in the application data store.

Once a portion of intermediate code has been identified for compilation, the virtual machine sends the code to a compilation server 422 through the radio network interface 418 or the wireless network interface 416 of the mobile device 402.

The compilation server includes a network interface 424 through which the server receives the intermediate code transmitted over a network by the mobile device. The compilation server includes a compiler 428, which is capable of compiling the intermediate code into native code for at least one mobile platform. The native code to be compiled is determined based on the mobile platform including the machine instruction set of the mobile device and the system software being executed by the device. The platform-specific compiler is capable of generating native code for one or more different mobile device platforms.

In some implementations, the compilation server uses a native code cache 426. The native code cache may be stored locally on the compilation server, or may be stored in common storage, for example the common storage 114 of FIG. 1. The native code cache stores native code compiled from intermediate code submitted during prior requests. In some implementations, the native code cache may include native code which was pre-compiled prior to the compilation server receiving any requests from mobile devices. The stored native code may be delivered to mobile devices which subsequently request that the same intermediate code be compiled. For example, a mobile device requests that portion B of application A be compiled for mobile platform C. If later another mobile device request the same portion B of the same application A be compiled for the same mobile platform C, the compiler provides the previously compiled code stored in the native code cache in response to the request. In some implementations, the compilation server may compile native code for multiple mobile platforms in response to receiving a request for native code for one mobile platform.

In some implementations, the mobile device has a timeout mechanism which only waits for a certain period (for example, 5 seconds, 10 seconds, 20 seconds, or 1 minute). If the native code is not returned within the period, the intermediate code is executed. In other implementations, the mobile device begins executing intermediate code before submission of the intermediate code to the compilation server, once the native code is received from the server the virtual machine begins executing the native code in place of the intermediate code at the next possible opportunity. In addition, the native code may be stored in the application data store and for use with subsequent executions of the application.

Figure 5:
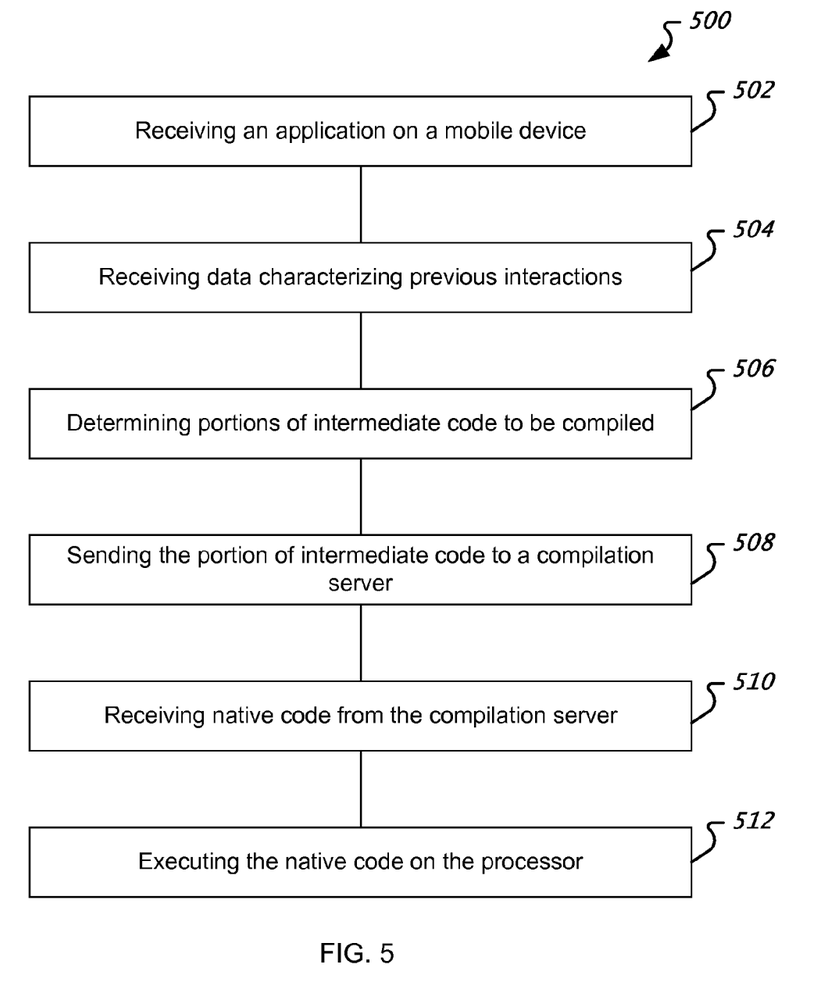
FIG. 5 shows a flow chart illustrating operations of the mobile device.

FIG. 5 shows a flow chart illustrating operations of the mobile device. The example process 500 may be implemented by a mobile device, for example, in the mobile device 102 of FIG. 1.

The process receives an application on a mobile device (502). The application may be provided by an application server or may reside on the mobile device. The application has intermediate code.

The process receives data characterizing previous interaction of the mobile device with the application (504). The data includes a profile which tracks the activities of the virtual machine as it interprets the application code. The data may include summaries of the activities. For example, the number of times a portion of the application has been executed and the average amount of time spent executing the portion of the application.

The process determines a portion of intermediate code to be compiled (506). The process determines intermediate code to be compiled based on the data. In some implementations, the data identifies portions of the application frequently accessed by the user. In other implementations, the data is used to identify portions of the application take longer to execute than other portions, and therefore may benefit from compilation.

The process sends the portion of the intermediate code to a compilation server (508). In some implementations, the process sends the portion of the intermediate code to a hosted compilation server system, for example, a compilation service hosted in a cloud computing environment.

The process receives native code from the compilation server (510). The compilation server sends compiled native code corresponding to the sent intermediate code to the mobile device. In some implementations, the compilation server maintains a cache of compiled code; and, before compiling an application, the compilation server checks the cache to determine if it the requested code has been already compiled. If the code has been compiled, the compilation server sends the cached code to the mobile device, instead of recompiling the intermediate code a second time.

The process integrates the native code into the operations of the application, enabling the processor to execute the native code as part of the application.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving an application on a mobile device, the mobile device including a processor for executing native code and an interpreter for interpreting intermediate code, wherein the application includes at least one machine instruction;
receiving data characterizing prior actions of the application on the mobile device, the data indicating at least an average time spent by the interpreter interpreting portions of the intermediate code of the application;
determining a portion of intermediate code to be compiled into native code based at least in part on the data indicating the average time spent by the interpreter interpreting the portion exceeding a time threshold, wherein the portion includes some but not all of the application;
after determining the portion of intermediate code to be compiled based on the average time spent, invoking the interpreter at the mobile device to begin executing the portion of the intermediate code;
after the interpreter is invoked, sending the portion of intermediate code over a network to a compilation server to compile the portion of intermediate code into native code while the portion of intermediate code concurrently executes by the interpreter;
receiving the native code corresponding to the portion of intermediate code from the compilation server;
when the native code corresponding to the intermediate code is not received from the compilation server within a threshold time period, continuing to execute the portion of the intermediate code by the interpreter at the mobile device; and
when the native code corresponding to the intermediate code is received from the compilation server within the threshold time period, executing the native code on the processor at the mobile device in place of the executing portion of the intermediate code by the interpreter.

2. The method of claim 1, further comprising:
receiving, on the compilation server, the portion of intermediate code;
identifying a platform of the mobile device;
generating, on the compilation server, platform specific native code corresponding to the portion of intermediate code;
generating, on the compilation server, non-platform specific native code corresponding to the portion of intermediate code;
sending, from the compilation server, the platform specific native code to the mobile device;
storing the platform specific native code corresponding to the sent intermediate code on the compilation server for later use by a different mobile device; and
storing the non-platform specific native code on the compilation server for later use by a different mobile device.

3. The method of claim 2, wherein generating platform specific native code comprises:
determining that a previously compiled version of the platform specific native code is not available; and
compiling the portion of intermediate code into platform specific native code in response to determining that a previously compiled version of the platform specific native code is not available.

4. A non-transitory computer storage medium encoded with a computer program, the program comprising instructions that when executed by data processing apparatus cause the data processing apparatus to perform operations comprising:
receiving an application on a mobile device, the mobile device including a processor for executing native code and an interpreter for interpreting intermediate code, wherein the application includes at least one machine instruction;
receiving data characterizing prior actions of the application on the mobile device, the data indicating at least an average time spent by the interpreter interpreting portions the intermediate code of the application;
determining a portion of intermediate code to be compiled into native code based at least in part on the data indicating the average time spent by the interpreter interpreting the portion exceeding a time threshold, wherein the portion includes some but not all of the application;
after determining the portion of intermediate code to be compiled based on the average time spent, invoking the interpreter at the mobile device to begin executing the portion of the intermediate code;
after the interpreter is invoked, sending the portion of intermediate code over a network to a compilation server to compile the portion of intermediate code into native code while the portion of intermediate code concurrently executes by the interpreter;
receiving native code corresponding to the portion of intermediate code from the compilation server;
when the native code corresponding to the intermediate code is not received from the compilation server within a threshold time period, continuing to execute the portion of the intermediate code by the interpreter at the mobile device; and
when the native code corresponding to the intermediate code is received from the compilation server within the threshold time period, executing the native code on the processor at the mobile device in place of the executing portion of the intermediate code by the interpreter.

5. A system comprising:
a mobile device, the mobile device comprising a computer-readable medium having instructions stored thereon which, when executed by the mobile device, cause the mobile device to perform operations comprising:
receiving an application on the mobile device, the mobile device including a processor for executing native code and an interpreter for interpreting intermediate code, wherein the application includes at least one machine instruction;
receiving data characterizing prior interactions of the mobile device with the application, the data indicating at least an average time spent by the interpreter interpreting portions the intermediate code of the application;
determining a portion of intermediate code to be compiled into native code based, in part, on the data indicating the average time spent by the interpreter interpreting the portion exceeding a time threshold, wherein the portion includes some but not all of the application;
after determining the portion of intermediate code to be compiled based on the average time spent, invoking the interpreter at the mobile device to begin executing the portion of the intermediate code;
after the interpreter is invoked, sending the portion of the intermediate code over a network to a compilation server to compile the portion of intermediate code into native code while the portion of intermediate code concurrently executes by the interpreter;

receiving native code corresponding to the sent intermediate code from the compilation server;

when the native code corresponding to the intermediate code is not received from the compilation server within a threshold time period, continuing to execute the portion of the intermediate code by the interpreter at the mobile device; and when the native code corresponding to the intermediate code is received from the compilation server within the threshold time period, executing the native code on the processor at the mobile device in place of the executing portion of the intermediate code by the interpreter.

6. The system of claim 5, wherein the mobile device is a hand held cellular telephone device.

7. The system of claim 5, further comprising:

a compilation server, the compilation server comprising a computer-readable medium having instructions stored thereon which, when executed by the compilation server, cause the mobile device to perform operations comprising:

receiving the portion of intermediate code;

identifying a platform of the mobile device;

generating platform specific native code corresponding to the portion of intermediate code;

generating non-platform specific native code corresponding to the portion of intermediate code;

sending the platform specific native code to the mobile device;

storing the platform specific native code corresponding to the sent intermediate code on the compilation server for later use by a different mobile device; and storing the non-platform specific native code on the compilation server for later use by a different mobile device.

8. The system of claim 7, wherein generating platform specific native code comprises:

determining that a previously compiled version of the platform specific native code is not available; and compiling the portion of intermediate code into platform specific native code in response to determining that a previously compiled version of the platform specific native code is not available.

9. A system comprising:

a mobile device, the mobile device comprising a computer-readable medium having instructions stored thereon which, when executed by the mobile device, cause the mobile device to perform operations comprising:

receiving an application on the mobile device, the mobile device including a means for executing native code and a means for interpreting intermediate code, wherein the application includes at least one machine instruction;

means for receiving data characterizing prior interactions of the mobile device with the application, the data indicating at least an average time spent by the interpreter interpreting portions the intermediate code of the application;

means for determining a portion of intermediate code to be compiled into native code based, in part, on the data indicating the average time spent by the interpreter interpreting the portion exceeding a time threshold, wherein the portion includes some but not all of the application;

after determining the portion of intermediate code to be compiled based on the average time spent, invoking the interpreter at the mobile device to begin executing the portion of the intermediate code;

after the interpreter is invoked, sending the portion of the intermediate code over a network to a compilation server to compile the portion of intermediate code into native code while the portion of intermediate code concurrently executes by the interpreter;

receiving native code corresponding to the sent intermediate code from the compilation server;

when the native code corresponding to the intermediate code is not received from the compilation server within a threshold time period, continuing to execute the portion of the intermediate code by the interpreter at the mobile device; and when the native code corresponding to the intermediate code is received from the compilation server within the threshold time period, executing the native code on the processor at the mobile device in place of the executing portion of the intermediate code by the interpreter.

10. The system of claim 9, wherein the mobile device is a hand held cellular telephone device.

11. The system of claim 9, further comprising:

a compilation server, the compilation server comprising a computer-readable medium having instructions stored thereon which, when executed by the compilation server, cause the mobile device to perform operations comprising:

receiving the portion of intermediate code;

identifying a platform of the mobile device;

generating platform specific native code corresponding to the portion of intermediate code;

generating non-platform specific native code corresponding to the portion of intermediate code;

sending the platform specific native code to the mobile device;

storing the platform specific native code corresponding to the sent intermediate code on the compilation server for later use by a different mobile device; and storing the non-platform specific native code on the compilation server for later use by a different mobile device.

12. The system of claim 11, wherein generating platform specific native code comprises:

means for determining that a previously compiled version of the platform specific native code is not available; and means for compiling the portion of intermediate code into platform specific native code.

* * * * *